INVENTOR.
WELLINGTON W. PORTER
BY
ATTORNEY.

Jan. 3, 1956    W. W. PORTER    2,729,049
PICKUP WITH BELT STRIPPING MEANS
Filed May 9, 1952    2 Sheets-Sheet 2
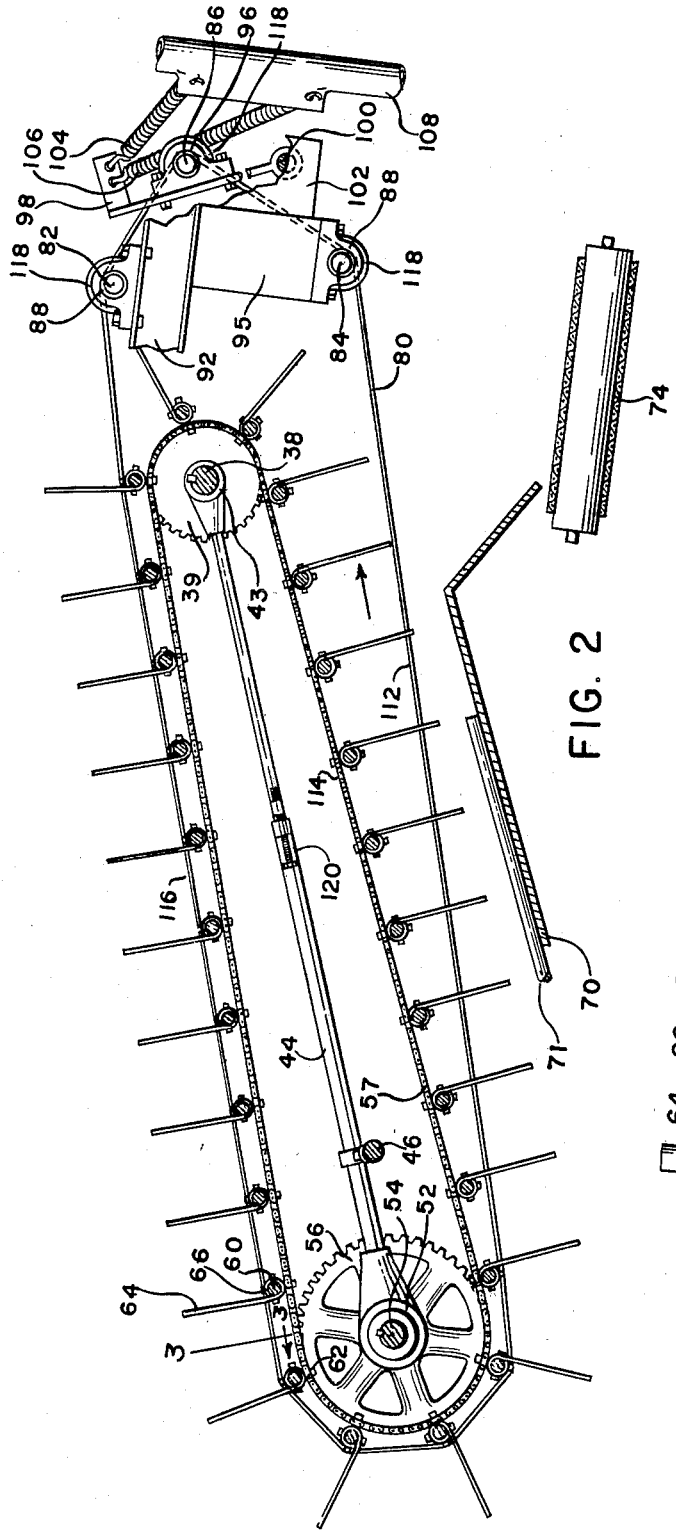
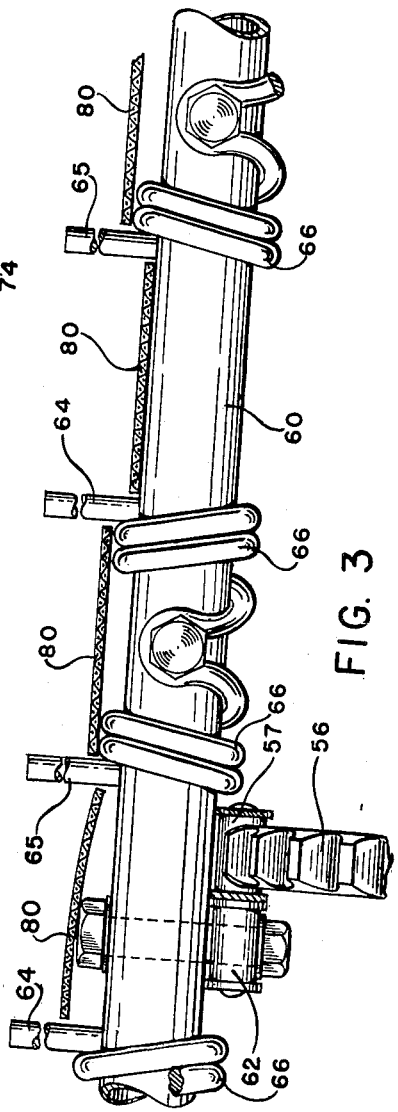
INVENTOR.
WELLINGTON W. PORTER
BY
ATTORNEY.

United States Patent Office 2,729,049
Patented Jan. 3, 1956

2,729,049

PICKUP WITH BELT STRIPPING MEANS

Wellington W. Porter, Waterloo, N. Y.

Application May 9, 1952, Serial No. 286,985

12 Claims. (Cl. 56—364)

This invention relates to harvesters, and more particularly to feeding means cooperating with a ramp in which provision is made for effective stripping of the feeding means and compacting of the mass.

In copending application Serial No. 175,761, filed July 25, 1950, and now Patent 2,674,838, there is disclosed an endless belt feeding mechanism of a flexible construction for accommodating uneven ground, adapted to cooperate with a flexible ramp, and in which stripping is effected by belt-carried mechanism rendered operative by the curvature of the belt around the discharge end of the supporting sprockets. Such disclosure is an improvement upon the structure shown in Patent No. 2,524,077, and application Serial No. 786,454, filed November 17, 1947, and now Patent 2,614,379.

The present invention is directed to an improved stripping mechanism employing endless stripper belts cooperating with endless belt feed mechanism in which the stripper belts are so mounted as to provide reaches thereof extending in an inclined direction away from the endless feed belt mechanism, so as to cause gradual stripping from the feed mechanism in the direction of feeding.

The invention further has to do with the provision of a multiple flat belt stripping mechanism, adapted to provide a substantially solid stripping front, adjacent belts being separated by relatively narrow feeding tines.

Further, the invention relates to a multiple flat belt stripping mechanism cooperating with stripping tines and an adjacent ramp whereby vines, spinach, and the like may be driven up the ramp and compacted in the process, and discharged in a compacted mass upon a transverse conveyor.

Further, the invention has to do with the provision of a high speed harvester for the cutting and loading of peas, spinach, turnip greens, and the like, having provision for continuous feeding and compacting to materially reduce the bulk and facilitate subsequent conveying and loading.

Further, the invention is directed to apparatus of the type described adapted to be mounted in a flexible framework whereby accommodation to uneven ground is provided for.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 2 is a longitudinal sectional view through the feed mechanism of Figure 1; and Figure 3 is an enlarged sectional view taken in the region indicated by the line 3—3 of Figure 2.

Figure 1:
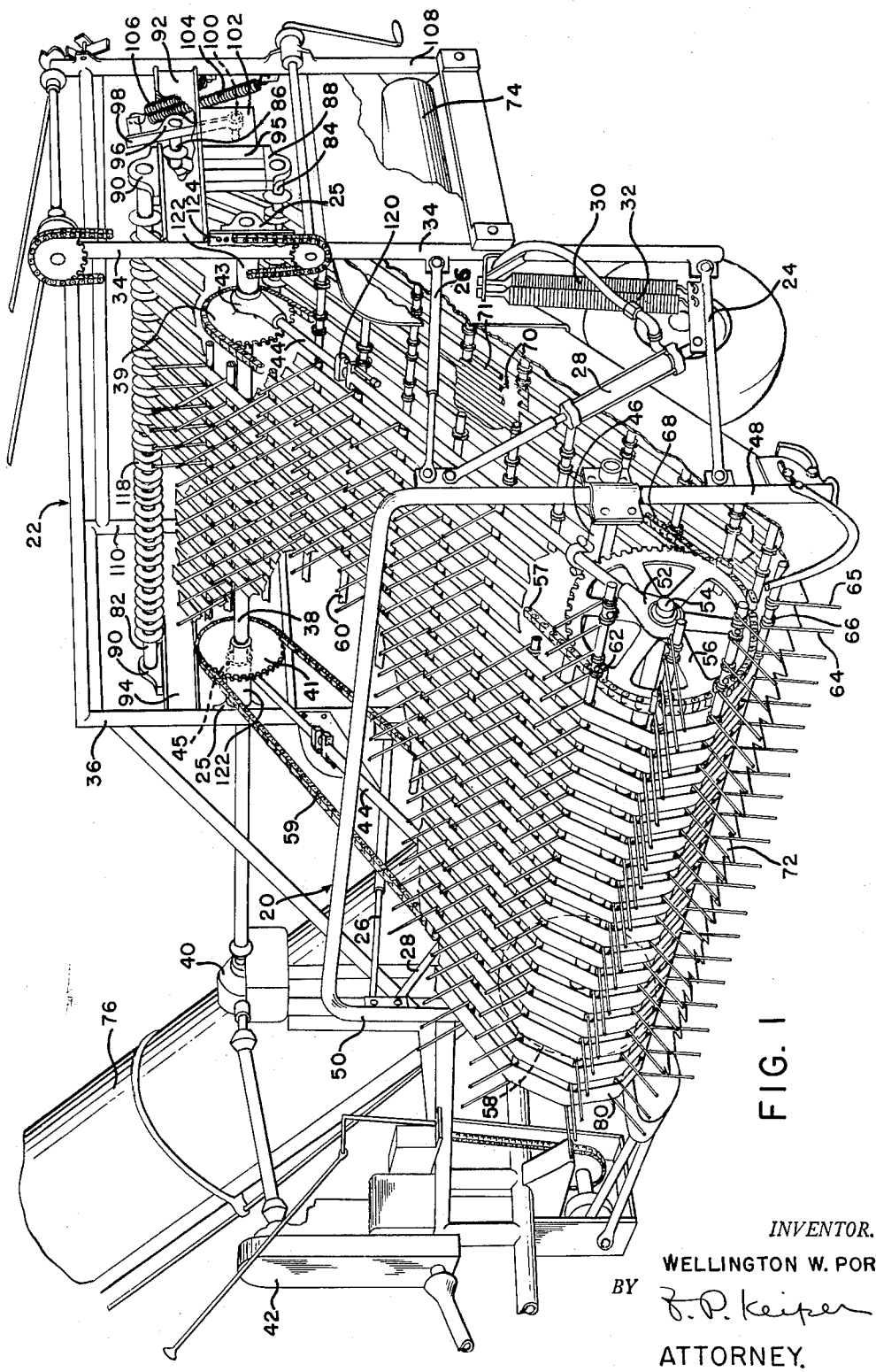
Figure 1 is a perspective view of the mechanism, parts being broken away for a clearer understanding.

Referring to the drawings, and particularly Figure 1, there will be seen a forward frame 20, and a rear frame 22, the forward frame being supported from the rear frame on either side by universally connected links such as 24 and 26, and hydraulic lifting struts 28. The frame is similar in respect to flexibility to that disclosed in application Serial No. 175,761, filed July 25, 1950, and application Serial No. 786,454, filed November 17, 1947. The frame 20 is preferably counterbalanced at opposite sides by tension springs such as 30 and 32.

The vertical members 34 and 36 of the rear frame 22 are provided with spaced bearings such as 25 between which extends a drive shaft 38, such shaft being fitted adjacent to either end and within the bearings 25, with sprockets 39 and 41.

The shaft 38 is driven through gearing 40 and 42 by an auxiliary drive shaft of a tractor to which the apparatus is coupled, as will be understood by reference to the aforesaid applications.

The shaft 38 is provided with spaced bearings 43 and 45, located within the bearings 25 and outside the sprockets 39 and 41, to which are attached inclined forwardly extending reach bars 44, which bars extend across and rest upon a transverse bar 46 extending between the upright portions 48 and 50 of the forward frame 20. The reach bars are loosely held in position upon the transverse bar 46. The extreme lower forward ends of the bars 44 are provided with bearings 52, in which is journaled a transverse shaft 54 having spaced sprockets 56 and 58 in alignment with sprockets 39 and 41. Endless chains 57 and 59 extending over each of sprockets 39 and 56 and 41 and 58, respectively, provide a supporting structure for a plurality of spaced transverse bars 60.

Each of the bars 60 is secured to the chain by swivel blocks 62 and carries a plurality of pairs of tines 64 and 65 uniformly spaced along their length, the tines being formed of spring steel and arranged in pairs as shown in Figure 3, adjacent spaced tines being connected by integral resilient coiled portions 66, wrapped around and secured to the bars 60. Such tines are adapted to project at right angles from the chain, and are adapted when carried along by the under reach 68 of the chains to skirt along with their extremities adjacent to the surface formed by the bars or slats 71 of the inclined ramp 70.

At the lower forward end of the ramp 70 is a cutter mechanism 72, which is adapted to sever, close to the ground, spinach, pea vines, and the like, which are thereafter propelled up the ramp 70 by the tines 64 and 65. The upper end of the ramp 70 is adapted to discharge upon a transverse conveyor belt 74, for delivering to an inclined conveyor elevator positioned within the housing 76.

In order to strip the vines, spinach, or the like from the tines 64, 65, as such material approaches the upper end of the ramp 70, a plurality of flat belts 80 are provided, each of such belts being arranged between each pair of spaced tines 64 and 65. Such belts are adapted to be driven by the chain-driven transverse bars 60. The upper ends of such belts are extended to pass over shafts 82, 84, and idler shaft 86, the shafts 82 and 84 being journaled at their opposite ends in bearings 88 and 90, the former mounted upon the horizontal channel members 92 and 94, and the latter on depending supports such as 95. The shaft 86 is journaled in spaced bearings at opposite ends as shown at 96, each bearing being mounted upon hinge-like straps 98 hinged as at 100 on bracket members 102 affixed to and extending rearwardly of the depending supports 95. Each of such straps are rearwardly tensioned by springs 104 and 106 extending to the rear frame members 108 and 110, so that the shaft 86 provides even tension for the belts along its length at all times.

The lower shaft 84 is so positioned that the lower reach 112 of the stripper belts 80 extends along tangentially from the forward sprocket assembly at an angle from the reach 114 of the chains, the angle being such that the reach 112 is positioned away from the reach 114 at the upper end of the ramp 70 by a distance substantially the length of the tines 64 and 65. Thus, the belts, which substantially bridge the space between each pair of tines 64 and 65, are adapted to strip the tines of all material being conveyed up the ramp at the upper end thereof immediately prior to being deposited upon the transverse conveyor belt 74.

The belts 80 are adequately positioned and properly retained and guided between their respective pairs of tines, particularly with respect to the descending reach 116. The belts, however, are guided into the proper position between tines by individual flanged drums 118, mounted and secured upon the shaft 82, such drums being accurately aligned to feed the belts in their travel forward, so as to be properly located between pairs of tines 64 and 65. While the shafts 84 and 86 may also be provided with such guiding flanged drums, it will be appreciated that the flanged drums 118 on shaft 82 are of considerable importance in assuring that each belt will be fed toward the bars 60, suitably positioned to fall between the spaced tines.

In practice, for maximum effectiveness, the plurality of belts 80 will cover substantially the entire width of the gathering device, only sufficient spacing between belts being provided for the multiplicity of pairs of tines 64 and 65. Such construction assures the complete stripping of the tines so that a clean delivery of material to the conveyor 74 is effected. In practice, such belts may be made of flexible rubberized canvas or other suitable material.

The reach bars 44 are made adjustable as at 120, and the shaft 38 is protected at its ends by sleeves 122 affixed as desired to the adjacent ends of the bearings 25. In order to adjust the clearance between the tips of the tines with the end of the ramp, the bearings 25 for shaft 38 may be adjusted, there being provided a series of holes on the bearing support plates 124 affixed to the bars 34 and 36, respectively, for this purpose.

The invention has been described as an improvement upon the disclosure of application Serial No. 175,761, hereinabove referred to, and all the features of flexibility referred to therein, that is the flexibility or warping of frame 20 with respect to frame 22, may take place without in any way interfering with the action of the stripping or feeding mechanism. Since the flanged drums 118 of shaft 82 feed the belts in proper relation toward the bars and tines at the upper end of the endless chain-supported apparatus, flexibility of the framework cannot interfere with the operation of the feeding and stripping apparatus.

It will be seen from the foregoing description that downwardly projecting tines at the lower end of the endless chain assembly will gather freshly cut vines, spinach or other crop, delivering the same along the ramp 70 and warping ramp bars 71, and discharging the same upon the transverse conveyor 74. The reaches 112 converge toward the plane of the ramp at its upper end, providing a combined effect of stripping the vines from the tines, and at the same time, compacting the vines so as to reduce their bulk immediately prior to delivery to the conveyor 74. The belts being relatively wide, and spaced only by the tines, offer a substantially solid front for the compacting operation.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvester comprising, an inclined ramp, a pair of parallel laterally spaced chains mounted upon forward and rear sprockets above said ramp, the lower reaches of said chains extending substantially parallel to but spaced above said ramp, transverse bars carried by said chains in spaced substantially parallel relation, feeding tines secured to said bars of a length substantially that of the spacing between said reaches and ramp and extending substantially perpendicularly thereto, means for moving said lower reaches in an upward direction, stripper belts arranged around said bars and between said tines, and idler pulley means for said belts disposed below and to the rear of said rear sprockets, whereby a reach of said belts extends diagonally away from the lower reaches of said chains.

2. A harvester comprising, an inclined ramp, a pair of parallel laterally spaced chains mounted upon forward and rear sprockets above said ramp, the lower reaches of said chains extending substantially parallel to but spaced above said ramp, transverse bars carried by said chains in spaced substantially parallel relation, feeding tines secured to said bars of a length substantially that of the spacing between said reaches and ramp and extending substantially perpendicularly thereto, means for moving said lower reaches in an upward direction, idler pulley means disposed below and to the rear of said rear sprockets, and stripper belts extending around said bars and between said tines and over said idler pulley means.

3. A harvester comprising, an inclined ramp, a pair of parallel laterally spaced chains mounted upon forward and rear sprockets above said ramp, the lower reaches of said chains extending substantially parallel to but spaced above said ramp, transverse bars carried by said chains in spaced substantially parallel relation, feeding tines secured to said bars of a length substantially that of the spacing between said reaches and ramp and extending substantially perpendicularly thereto, means for moving said lower reaches in an upward direction, stripper belts arranged around said bars and between said tines, and means for guiding the lower reaches of said belts along a path inclined rearwardly away from said bars.

4. A harvester comprising, an inclined ramp, a pair of parallel laterally spaced chains mounted upon forward and rear sprockets above said ramp, the lower reaches of said chains extending substantially parallel to but spaced above said ramp, transverse bars carried by said chains in spaced substantially parallel relation, outwardly extending feeding tines secured to said bars, means for moving said lower reaches in an upward direction, and stripper belts arranged around said bars, said stripper belts having a lower reach inclined rearwardly away from said bars.

5. A harvester comprising, an inclined ramp, endless chain means mounted above said ramp with the lower reach thereof extending substantially parallel with and above the ramp and spaced therefrom, feeding means mounted on said chain means in transverse spaced successive rows and adapted to reach substantially to said ramp, means for moving said lower reaches in an upward direction, means for stripping said feeding means, said stripping means comprising belts moving with said feeding means, said belts having reaches extending rearwardly and diagonally away from the lower reach of said chain means.

6. A harvester comprising, a ramp, endless feed means above said ramp having a lower reach substantially parallel with and above said ramp, said feed means comprising end wheels and feed tines adapted to extend toward said ramp when in said reach, means for moving said lower reaches in an upward direction, stripper belts arranged between said feed tines and having reaches extending diagonally away from said endless feed means reach.

7. A harvester comprising, a main transverse frame, ground wheels adapted to support said frame, a forward frame, substantially parallelogram linkages interconnecting said frames at opposite ends, for affording relative movement between the frames, the forward frame thereby having substantially vertical and warping movement relative to the main frame, a warpable ramp having its forward lower end carried by said forward frame, and its rearward upper end carried by said main frame, plant gathering means carried by said forward frame extending substantially the width of the ramp lower edge, warpable endless feed means located above the ramp for moving gathered plants along and up the ramp, stripping means carried by said feed means, said stripping means comprising endless belts having reaches extending diagonally away from said feed means and toward the upper end of the ramp and means for moving said reaches toward the upper end of the ramp.

8. A harvester comprising, a frame comprising a rearward transverse member, and a forward transverse member flexibly supported therefrom, a warpable ramp having its lower forward end carried by said flexibly supported member, gathering means extending transversely substantially the width of the forward ramp end and carried by said last-named member, means warpable with the ramp and located above the ramp for moving vines and the like up the ramp, said last-named means comprising an endless belt feeding means warpable with said ramp, stripping means for said endless belt feeding means, said stripping means comprising endless stripping belts having reaches extending diagonally away from said feeding means toward said ramp, and means for driving said reaches in a direction up the ramp.

9. A harvester comprising, a main transverse frame, ground wheels adapted to support said frame, a forward frame, substantially parallelogram linkages interconnecting said frames at opposite ends, for affording relative movement between the frames, the forward frame thereby having substantially vertical and warping movement relative to the main frame, a warpable ramp having its forward lower end carried by said forward frame, and its rearward upper end carried by said main frame, plant gathering means carried by said forward frame extending substantially the width of the ramp lower edge, warpable endless feed means located above the ramp for moving gathered plants along and up the ramp, spaced shafts and wheels supporting an endless belt feeding means above said ramp, for feeding material up said ramp, stripping means comprising endless belts driven by said endless belt feeding means, said endless belts having reaches extending diagonally from the forward end of said feeding means toward the upper end of said ramp, and means for driving said reaches in a direction up the ramp.

10. A harvester comprising, an inclined ramp, endless conveying mechanism having a reach thereof extending over said ramp in substantially parallel relation thereto, said conveying mechanism having spaced means projecting downwardly toward said ramp adapted to engage material for delivery up the ramp, endless stripping and compacting means superimposed upon said endless conveying means, said stripping and compacting means comprising a plurality of belts arranged between said projecting means, and means for causing said stripping and compacting means to move in a diagonal path away from the lower end of said conveying mechanism toward the upper end of said ramp.

11. A harvester comprising, an inclined ramp, endless chain means mounted above said ramp with the lower reach thereof extending substantially parallel with the ramp and spaced therefrom, feeding means mounted on said chain means in transverse spaced successive rows and adapted to reach substantially to said ramp, means for stripping said feeding means, said stripping means comprising belts moving with said feeding means and located between said feeding means, said belts having lower reaches extending rearwardly and diagonally away from the lower reach of said chain means, and upper reaches adapted to be guided toward said chain means between said feeding means, guide means for aligning said upper reaches in relation to said feeding means, and means for moving the lower reaches in a direction up the ramp.

12. A harvester comprising, an inclined ramp, a pair of parallel laterally spaced chains mounted upon forward and rear sprockets above said ramp, the lower reaches of said chains extending substantially parallel but spaced from said ramp, transverse bars carried by said chains in spaced substantially parallel relation, spaced feeding tines secured to said bars of a length substantially that of the spacing between said reaches and ramp and extending substantially perpendicularly thereto, stripper belts arranged around said bars and between said tines, means for guiding the lower reaches of said belts along a path inclined rearwardly away from said bars, means for guiding the upper reaches of said belt to positions between said tines, and means for moving the lower reaches in a direction up the ramp.

References Cited in the file of this patent

UNITED STATES PATENTS

| | | |
|---|---|---|
| 1,332,866 | Emerson | Mar. 2, 1920 |
| 1,431,640 | Ennis | Oct. 10, 1922 |
| 1,863,637 | Richardson | June 21, 1932 |
| 2,242,077 | Jones | May 13, 1941 |
| 2,499,550 | Webb | Mar. 7, 1950 |
| 2,546,318 | Rayburn | Mar. 27, 1951 |